E. R. GREER.
POWER OPERATED MECHANISM FOR TRACTION PLOWS.
APPLICATION FILED MAY 25, 1914.
1,199,005.
Patented Sept. 19, 1916.
2 SHEETS—SHEET 1.
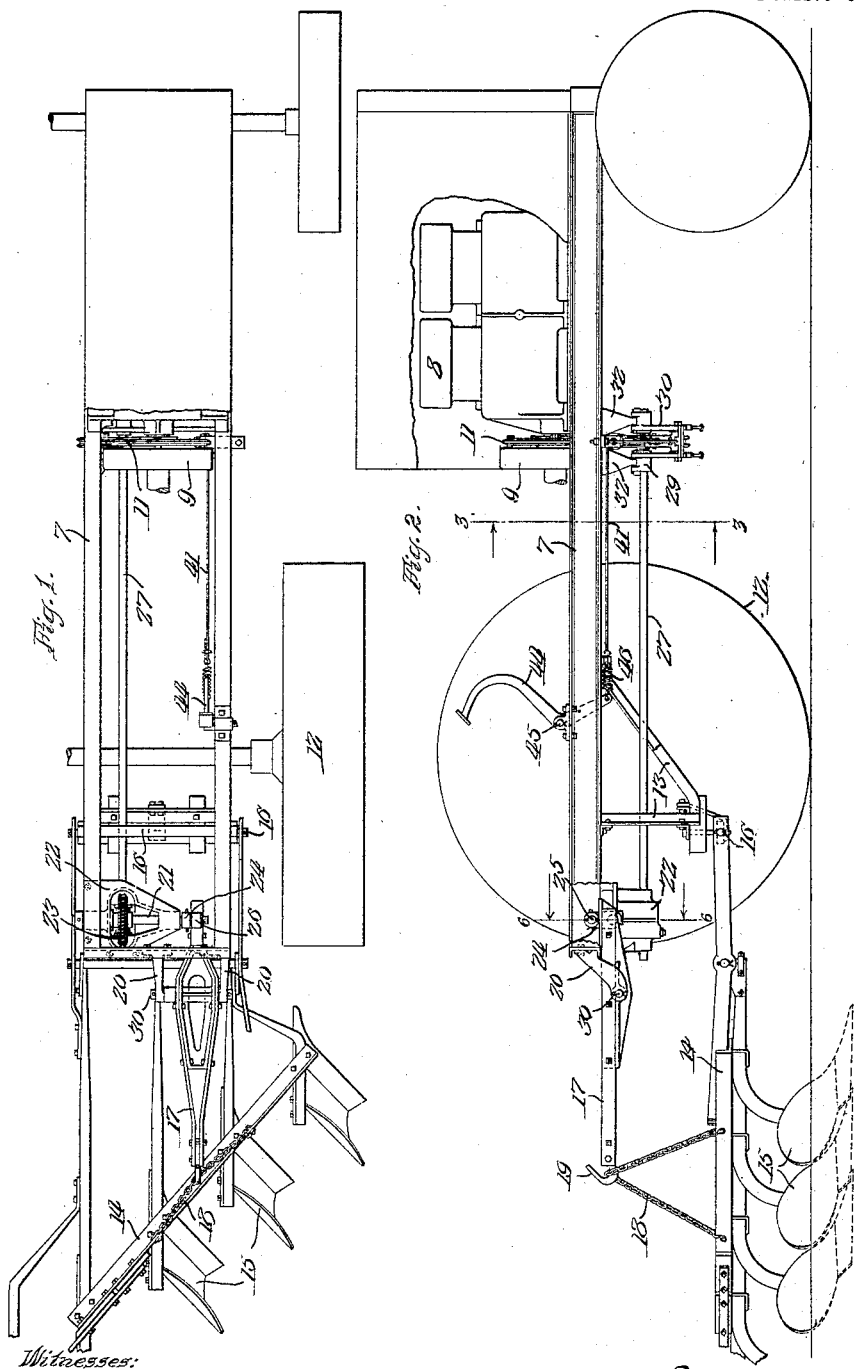

E. R. GREER.
POWER OPERATED MECHANISM FOR TRACTION PLOWS.
APPLICATION FILED MAY 25, 1914.
1,199,005.
Patented Sept. 19, 1916.
2 SHEETS—SHEET 2.
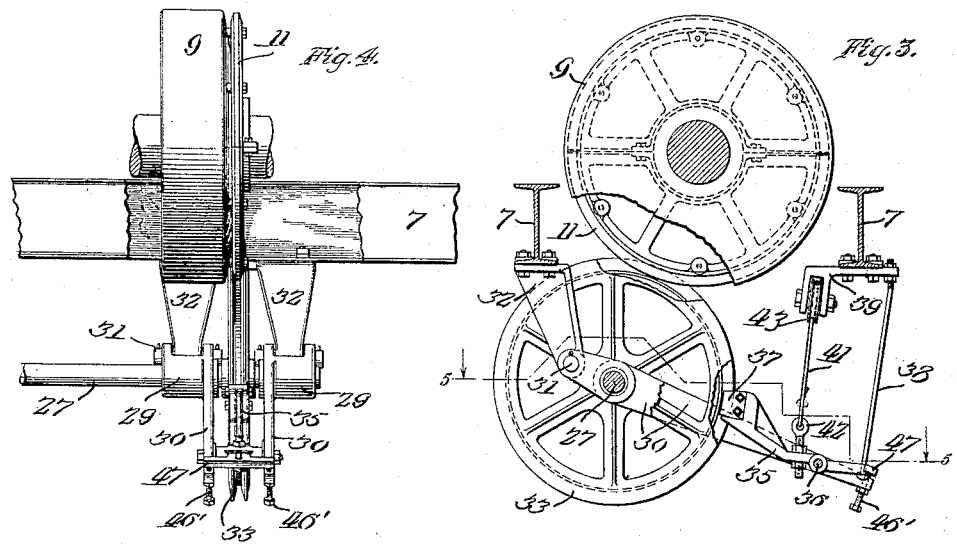
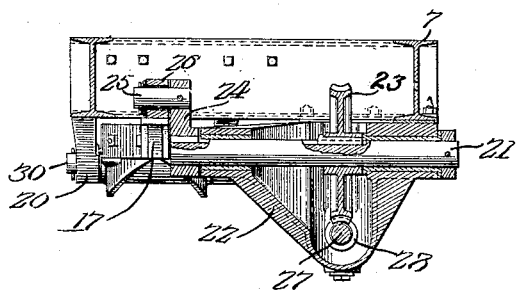
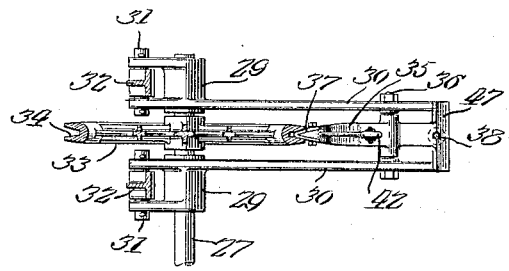

UNITED STATES PATENT OFFICE.

EDWARD R. GREER, OF MINNEAPOLIS, MINNESOTA, ASSIGNOR TO EMERSON-BRANTINGHAM COMPANY, OF ROCKFORD, ILLINOIS, A CORPORATION OF ILLINOIS.

POWER-OPERATED MECHANISM FOR TRACTION-PLOWS.

1,199,005.  Specification of Letters Patent.  Patented Sept. 19, 1916.

Application filed May 25, 1914. Serial No. 840,870.

*To all whom it may concern:*

Be it known that I, EDWARD R. GREER, a citizen of the United States, residing at Minneapolis, in the county of Hennepin and State of Minnesota, have invented certain new and useful Improvements in Power-Operated Mechanism for Traction-Plows, of which the following is a specification.

This invention relates in general to tractor-operated implement lifts and more particularly to the mechanism for raising and lowering the implement, the primary aim of the invention being to provide simple and effective raising and lowering mechanism by means of which implement frames, directly connected to or carried by a tractor frame, may be readily moved from operative to inoperative position and vice versa.

My invention also has for its object the provision of tractor implement lifting mechanism which can be applied to existing tractors as well as to tractors in process of construction.

Another object is to provide lifting mechanism which can be readily thrown into and out of operation by the operator and which will automatically retain the implement in any position to which they may have been raised or lowered.

A further object is the provision of mechanism of this character which will be friction driven so that the mechanism may be thrown into operation without subjecting the same to undue shocks and strains.

Still another object is the provision of controlling mechanism, including a brake member, which will be automatically applied and retained in operative position when the lifting mechanism is thrown out and will be automatically released when the lifting mechanism is thrown into operation.

Many other objects and advantages of my invention will be readily apparent to those skilled in the art as the same becomes better understood by reference to the following description when considered in connection with the accompanying drawings.

Referring to the drawings—Figure 1 is a fragmentary plan view of a tractor plow embodying my invention; Fig. 2 is a side elevation of the construction shown in Fig. 1; Fig. 3 is a sectional view taken on the line 3—3 of Fig. 2; Fig. 4 is an enlarged detail view looking toward the left of the construction shown in Fig. 3; Fig. 5 is a sectional view on the line 5—5 of Fig. 3, and Fig. 6 is a sectional view on the line 6—6 of Fig. 2.

On the drawings reference character 7 designates generally the main frame of a tractor of any preferred construction, the tractor being shown diagrammatically only on the drawings for the reason that the structural details thereof are not material to my present invention. Upon the tractor frame is mounted the usual engine 8 and to the inner or forward face of the fly wheel 9 there is secured a substantially V-shaped friction member or wheel 11, the purpose of which will be later explained.

Rigidly secured to the underside of the tractor frame, preferably between the tractor wheels 12, is a bracket or frame 13 to which the plow frame 14, equipped with plows 15, is pivotally attached by means of a transversely extending pivot-bar 16. The plow frame is adapted, therefore, to be lifted and lowered about this pivotal connection. To the rear end of the tractor frame I have secured a pair of bracket arms 20 between which, upon a pin or pintle 30, the lifting arm 17 is pivoted intermediate its ends. The outer end of arm 17 is connected with the plow frame by means of a chain or other suitable connection 18 engaged with the hook 19 carried by the arm.

A crank shaft 21 is journaled in a suitable housing 22 secured to the tractor frame 7, said shaft being equipped intermediate its ends with a worm-wheel 23 by means of which the shaft is driven, and a crank arm 24 fixedly mounted on one end of the crank shaft is provided at its outer end with a pin 25 carrying a roller 26 which overlies and engages with the upper face of the inner end of the lifting frame 17 and best shown in Figs. 2 and 6. When the shaft is in the position shown in Figs. 2 and 6 the outer end of the lifting arm will be in lowered position to dispose the plows in working relation with the ground. A half revolution of the crank shaft will depress the forward end of the lifting arm and elevate the rear end to lift the plows into inoperative position.

The crank shaft is driven through the intermediary of the worm-wheel 23 fixed thereon from a drive shaft 27 equipped with a worm 28 meshing with the worm-wheel, the rear end of the drive shaft being journaled in the housing 22 and the forward end being journaled in bearings 29 formed on a bifurcated arm 30 which is movable about the pivot pins 31 by means of which the arm is supported from a bracket 32 rigidly secured to the tractor frame 7. A friction member or wheel 33 is fixed on the drive shaft 27 between the bearings 29 and is provided with a peripheral substantially V-shaped groove 34 adapted to frictionally engage with the correspondingly shaped periphery of the friction wheel 11. It will be obvious that a slight upward movement of the arm 30 about its pivot pins 31 will bring the wheel 33 into coöperative relation with the wheel 11 so that the drive shaft 27 will be operated from the engine to rotate the crank shaft 21, thereby raising or lowering the plows.

A brake member 35 is pivotally mounted intermediate its ends on a bolt 36 extending between the spaced portions of the arm 30 and carries at its inner end a brake block or friction member 37 adapted to engage in the groove 31 and hold the wheel 33 against rotation. The outer end of the brake member is provided with an aperture through which a rod 38 passes, the lower end of the rod beneath the brake member being provided with a head and the upper end being attached to and suspended from a bracket 39 rigidly bolted to a member of the tractor frame 7. It will be obvious that the weight of the arm 30 and the forward end of the shaft 27 and wheel 33 are normally carried by this rod through the brake member and that the parts will be held under gravity in the position shown in Fig. 3 with the brake block in engagement with the wheel 33, as shown in Figs. 3 and 5.

For the purpose of releasing the brake and moving the friction wheel 33 into engagement with the driving friction wheel 11 I employ a cable 41 secured at one end through an eye 42 to the brake member at the opposite side of the bolt 36 from the rod 38, the cable being trained over a pulley 43 mounted in the bracket 39 and extended rearwardly beneath the tractor frame and connected at its rear end with the lower end of a foot lever 44 pivoted on the tractor frame at 45. A spring 46 is interposed between the end of the cable and the pedal lever in order that excessive movement of the pedal lever may not urge the wheel 33 so forcibly into engagement with the wheel 11 as to injure the mechanism. It will be obvious that when the upper end of the pedal lever is moved forwardly the cable will be drawn rearwardly over the pulley 43 to first lift the brake member out of engagement with the friction wheel 33. Swinging movement of the brake member upon its pivot is limited by stop-screws 46' threaded into and projecting upwardly from the separated portions of the arm 30. When the brake member has been swung on its pivot sufficiently to engage the outer end 47 thereof with the stop-screw continued movement of the cable will lift the arm 30 bodily, thereby carrying the friction wheel 33 upwardly into coöperative engagement with the drive wheel 11. The drive shaft 27, which will then be rotated from the friction wheel 11 through the friction wheel 33, will slowly rotate the crank shaft 21 to swing the lifting arm 27 about its pivot and thereby lift the plows out of the ground; that is, assuming that the parts are in the position shown in Fig. 2 when the operation was initiated. After a half revolution of the crank shaft has been effected the operator releases the foot pedal whereupon the wheel 33 will drop, under the influence of gravity, away from the wheel 11 and as soon as the outer end of the brake member drops into engagement with the head on the lower end of the rod 38 the brake block will be thrown into engagement with the wheel 33 to stop the rotation thereof and hold the wheel against rotation until the block is released by the next actuation of the pedal lever. The brake and also the worm 28 engaging with the worm wheel 23, will prevent any rotation of the rock shaft so long as the friction wheels are disengaged. When the pedal lever is next actuated the rock shaft will continue its revolution to bring the pin 25 from its lowermost to its highest position, thereby permitting the plows to lower, under the influence of gravity, into the operative position shown in Fig. 2.

The construction, arrangement and mounting of the implement frame and lifting lever are claimed in a divisional application, Serial No. 60,288, filed November 8, 1915.

It is believed that my invention and its mode of operation will be clearly understood from the foregoing without further description and it will be manifest that while I have described my invention in connection with a plow, nevertheless, it is equally well adapted for other agricultural implements, such as cultivators, harrows and the like, and while I have shown and illustrated one preferred embodiment of the invention it should be understood that the mechanical details disclosed are capable of considerable modification and variation without departing from the essence of the invention or sacrificing any of its material advantages.

I claim:

1. In a tractor implement lift, the combination of a lifting arm, a crank shaft associated therewith, a drive shaft connected at one end to said crank shaft and mounted at its other end in movable bearings, a friction wheel fixed on the movable end of said shaft, a driving friction wheel arranged for frictionally driving the first named wheel, means for moving said drive shaft to bring said wheels into coöperative relation, a brake, and means for automatically applying said brake to said first mentioned friction wheel upon disengagement of said wheel from said driving friction wheel.

2. In a tractor implement lift, the combination of a tractor frame, a lifting arm pivoted thereon, a movable arm mounted on said tractor frame, a shaft journaled at one end therein, a friction member fixed on said shaft, a brake member pivoted on said arm, manually operated means attached to said brake member for releasing the brake member from the friction member and subsequently moving said shaft by means of the brake member, means connected with said brake member for automatically throwing the brake member into engagement with said friction member when the manually operated means is released, and means whereby said lifting arm is operated from said shaft.

3. In a tractor implement lift, the combination of a pivoted arm, a shaft journaled in said arm, a friction wheel fixed on said shaft, a brake member pivoted on said arm, a device adapted to drive said friction wheel, means for holding said brake member in engagement with said friction wheel, and manually operated means independent of said holding means for releasing said brake member and subsequently operating said arm to move the friction wheel into engagement with said driving device.

4. In a tractor implement lift, the combination of a tractor frame, an internal-combustion engine mounted forwardly thereon, a drive-shaft extending from adjacent the engine to the rear end of the tractor frame, a friction wheel fixedly mounted on the engine shaft, a friction wheel fixedly mounted on the drive-shaft in coöperative relation to the first named wheel, a vertically movable lever pivotally mounted on the rear end of the tractor frame, a connection between the drive-shaft and said lever, a brake, means for applying said brake to the drive shaft friction wheel when said wheel is inoperative, and manually operable means attached to said brake for first releasing the brake and then moving the forward end of the drive shaft to carry its friction wheel into driving engagement with the wheel on the engine shaft.

5. In a tractor implement lift, the combination of a tractor frame, an internal combustion engine mounted forwardly thereon, a friction wheel fixedly mounted on the fly-wheel thereof, a drive-shaft extending longitudinally of the tractor frame, a vertically movable lever connected with the tractor frame, mechanism connected with the rear end of the drive-shaft for raising said lever, a friction wheel fixedly mounted on the forward end of the drive shaft in coöperative relation with the first named wheel, manually controlled means for moving the shaft-mounted friction wheel into and out of engagement with the said first named wheel, a brake, and means independent of said manually controlled means for forcing said brake against said shaft-mounted wheel when disengaged from said first mentioned wheel.

6. In a tractor implement lift, the combination of a tractor frame, a motor mounted thereon, a lifting lever pivoted to the rear end of said frame, a friction wheel connected to said motor, a shaft extending longitudinally of said frame, a friction wheel carried on the forward end of said shaft, means for raising and lowering the forward end of said shaft to bring said friction wheels into driving relation, means for automatically holding said shaft against rotation when said friction wheels are disengaged, and a worm gear connection between the rear end of said shaft and said lifting lever whereby said lever is held against movement when said shaft is stationary.

7. In a tractor implement lift, the combination of a frame, a motor mounted thereon, a friction wheel carried by said motor, an arm pivoted at one end to said frame, a driven friction wheel rotatably mounted on said arm intermediate its ends, a brake member pivoted on said arm adjacent its free end, means connected to said brake member at one side of its pivot for sustaining the weight of the arms and the elements carried thereby and urging said brake member into engagement with the driven friction wheel, and independent manually controlled means connected with said brake member at the other side of its pivot whereby upon movement of said means the brake member is first released from the wheel and then the wheel is moved into driving relation with the motor carried friction wheel.

EDWARD R. GREER.

Witnesses:
ALFRED KRIEG,
W. G. CLARK.

Copies of this patent may be obtained for five cents each, by addressing the "Commissioner of Patents, Washington, D. C."